United States Patent
Saintellemy et al.

(10) Patent No.: US 10,724,754 B2
(45) Date of Patent: Jul. 28, 2020

(54) METHOD AND SYSTEM FOR HOME AUTOMATION VIA THERMOSTAT

(71) Applicant: Q-LINKS HOME AUTOMATION INC., Montréal (CA)

(72) Inventors: Frantz Saintellemy, Montréal (CA); Chengyu Tu, Montréal (CA)

(73) Assignee: Q-LINKS HOME AUTOMATION INC., Montréal (CA)

( * ) Notice: Subject to any disclaimer, the term of this patent is extended or adjusted under 35 U.S.C. 154(b) by 0 days.

(21) Appl. No.: 15/520,925

(22) PCT Filed: Oct. 22, 2015

(86) PCT No.: PCT/CA2015/051068
§ 371 (c)(1),
(2) Date: Apr. 21, 2017

(87) PCT Pub. No.: WO2016/061686
PCT Pub. Date: Apr. 28, 2016

(65) Prior Publication Data
US 2018/0023829 A1 Jan. 25, 2018

Related U.S. Application Data

(60) Provisional application No. 62/067,648, filed on Oct. 23, 2014.

(51) Int. Cl.
*F24F 11/00* (2018.01)
*G05B 15/02* (2006.01)
(Continued)

(52) U.S. Cl.
CPC .............. *F24F 11/30* (2018.01); *F24F 11/62* (2018.01); *G05B 15/02* (2013.01);
(Continued)

(58) Field of Classification Search
CPC . F24F 11/30; F24F 11/62; F24F 11/58; G05B 15/02; G05B 2219/163;
(Continued)

(56) References Cited

U.S. PATENT DOCUMENTS 6,400,996 B1   6/2002  Hoffberg et al.
7,302,642 B2   11/2007 Smith et al.
(Continued)

FOREIGN PATENT DOCUMENTS

CA    2886451    7/2014
WO    9934339    7/1999
(Continued)

*Primary Examiner* — Charles R Kasenge
(74) *Attorney, Agent, or Firm* — Bereskin & Parr LLP/S.E.N.C.R.L., s.r.l.

(57) ABSTRACT

A thermostat system for accessing a home automation system includes a device interface module for accessing a first home automated device, a wide-area communication module for data communication with an external network, and a local communication module for data communication over a home automation network. The first home automated device may be an external HVAC device. A first command for accessing the first home automated device is received. A first access signal based on the first received command is generated and transmitted to the first home automated device. A second command for accessing the second home automated device is received. A second access signal based on the second received command is generated and transmitted to the second home automated device. The first access signal may be transmitted independently of the home automation network while the second access signal may be transmitted via the home automation network.

10 Claims, 14 Drawing Sheets

(51) Int. Cl.
  *G05D 23/19* (2006.01)
  *F24F 11/30* (2018.01)
  *F24F 11/62* (2018.01)
  *H04L 12/28* (2006.01)
  *F24F 11/58* (2018.01)
(52) U.S. Cl.
  CPC ......... *G05D 23/1902* (2013.01); *H04L 12/28* (2013.01); *H04L 12/2816* (2013.01); *H04L 12/2834* (2013.01); *F24F 11/58* (2018.01); *G05B 2219/163* (2013.01); *G05B 2219/2614* (2013.01); *G05B 2219/2642* (2013.01); *H04L 2012/285* (2013.01)
(58) Field of Classification Search
  CPC .... G05B 2219/2642; G05B 2219/2614; H04L 12/2834; H04L 12/2816; H04L 12/28; H04L 2012/285; G05D 23/1902
  See application file for complete search history.

(56) References Cited

U.S. PATENT DOCUMENTS

| | | | | |
|---|---|---|---|---|
| 7,522,063 | B2* | 4/2009 | Ehlers | G08B 7/06 340/286.01 |
| 8,090,477 | B1* | 1/2012 | Steinberg | G05D 23/1923 700/278 |
| 8,219,249 | B2* | 7/2012 | Harrod | G05B 19/042 700/276 |
| 8,547,238 | B2 | 10/2013 | Harchanko | |
| 8,950,688 | B2* | 2/2015 | Babich | G05D 23/1902 236/51 |
| 8,988,215 | B1* | 3/2015 | Trundle | G08B 25/08 340/539.11 |
| 9,046,898 | B2* | 6/2015 | Mucignat | G05D 23/1905 |
| 9,500,385 | B2* | 11/2016 | Weaver | H02J 3/14 |
| 9,600,011 | B2* | 3/2017 | Weaver | H02J 3/14 |
| 10,001,790 | B2* | 6/2018 | Oh | G08B 19/00 |
| 2003/0085795 | A1 | 5/2003 | An | |
| 2005/0270151 | A1* | 12/2005 | Winick | G08B 17/00 340/539.1 |
| 2007/0013532 | A1* | 1/2007 | Ehlers | G08B 7/06 340/584 |
| 2007/0241203 | A1* | 10/2007 | Wagner | G05D 23/1905 236/1 C |
| 2010/0070086 | A1* | 3/2010 | Harrod | G05B 19/042 700/276 |
| 2010/0102973 | A1 | 4/2010 | Grohman et al. | |
| 2010/0211224 | A1* | 8/2010 | Keeling | F24D 19/1066 700/277 |
| 2012/0061480 | A1* | 3/2012 | Deligiannis | G05B 15/02 236/51 |
| 2013/0211783 | A1* | 8/2013 | Fisher | G06F 11/30 702/182 |
| 2013/0231792 | A1 | 9/2013 | Ji et al. | |
| 2014/0096126 | A1* | 4/2014 | Gourlay | G05B 15/02 717/173 |
| 2014/0156085 | A1* | 6/2014 | Modi | G05D 23/19 700/276 |
| 2014/0244047 | A1* | 8/2014 | Oh | G08B 19/00 700/278 |
| 2014/0371921 | A1* | 12/2014 | Weaver | H02J 3/14 700/276 |
| 2015/0051741 | A1* | 2/2015 | Bruck | F24F 11/30 700/276 |
| 2015/0053780 | A1* | 2/2015 | Nelson | F24F 11/30 236/1 C |
| 2015/0053781 | A1* | 2/2015 | Nelson | F24F 11/30 236/1 C |
| 2015/0134122 | A1* | 5/2015 | Modi | G05D 23/19 700/276 |
| 2015/0362207 | A1* | 12/2015 | Abiprojo | F24F 11/30 702/183 |

FOREIGN PATENT DOCUMENTS

| | | |
|---|---|---|
| WO | 2014172374 | 10/2014 |
| WO | 2016101065 | 6/2016 |
| WO | 2016145514 | 9/2016 |

* cited by examiner

METHOD AND SYSTEM FOR HOME AUTOMATION VIA THERMOSTAT

CROSS REFERENCE TO RELATED APPLICATIONS

The present application is a 35 USC 371 national stage entry of PCT/CA2015/051068 filed on Oct. 22, 2015 and which claims priority on U.S. 62/067,648 filed on Oct. 23, 2014. These documents are hereby incorporated by reference in their entirety.

FIELD OF THE DISCLOSURE

The present disclosure relates to a system and method for home automation via a thermostat, and more particularly a method and system in which various devices of a building are accessed from a centralized thermostat system.

BACKGROUND OF THE DISCLOSURE

Traditional thermostats known in the art are operable to monitor environmental conditions of an area of a building and control the heating, ventilation, and air condition system ("HVAC system") of the building based on the sensed condition. Typically, the thermostat allows a user to set a desired temperature as a setpoint and the thermostat will control the HVAC system so that the setpoint temperature is maintained at the area of the building. Control is provided by making a heating call or a cooling call to the HVAC system.

More advanced thermostats allow programming of a thermostat so as to follow a preprogrammed schedule. For example, different setpoints can be set for different times of the day and the thermostat will control the HVAC system so as to maintain those setpoints at the different times. Even more modern thermostats allows the thermostat to be accessed remotely, such as over the internet via a mobile device, so as to vary the setpoint or monitor indoor conditions from a remote location.

Building automation or home automation pertains to the automated control of various devices found within the building home. Devices being automatically controlled include lighting, appliances, security systems, access systems (ex: locks), HVAC systems, etc.

SUMMARY

It would thus be highly desirable to be provided with a device, system or method that would at least partially address the disadvantages of the existing technologies.

The embodiments described herein provide in one aspect, a thermostat system comprising an HVAC interface module for controlling an external HVAC system, a wide-area communication module for data communication with an external network, a local communication module for data communication over a home automation network, and a processor configured for: receiving a first command for changing an environmental setting; generating a first control signal based on the received first command for controlling the external HVAC system via the HVAC interface; receiving a second command for changing a non-environmental setting; and generating a second control signal based on the received second command for controlling at least one home automated device via the local communication module and over the home automation network.

The embodiments described herein provide another aspect, a method for accessing a home automation system. The method comprises receiving a first command for changing an environmental setting, transmitting a first control signal based on the received first command for controlling an external HVAC system via a HVAC interface, receiving a second command for changing a non-environmental setting, and transmitting a second control signal based on the received second command for controlling a home automated device.

The embodiments described herein provide in yet another aspect a thermostat system comprising a device interface module for accessing a first home automated device, a wide-area communication module for data communication with an external network, a local communication module for data communication over a home automation network, and a processor configured for receiving a first command for accessing the first home automated device; generating a first access signal based on the received first command for accessing the first home automated via the device interface module and independently of the home automation network; receiving a second command for accessing a second home automated device; and generating a second access signal based on the received second command for accessing a second home automated device via the local communication module.

The embodiments described herein provide in yet another aspect a method for accessing a home automation system. The method comprises receiving a first command for accessing a first home automated device, generating a first access signal based on the received first command for accessing the first home automated via the device interface module and independently of the home automation network, receiving a second command for accessing a second home automated device, and generating a second access signal based on the received second command for accessing at least one home automated device via the local communication module.

DRAWINGS

The following drawings represent non-limitative examples in which.

DESCRIPTION OF VARIOUS EMBODIMENTS

Figure 1:
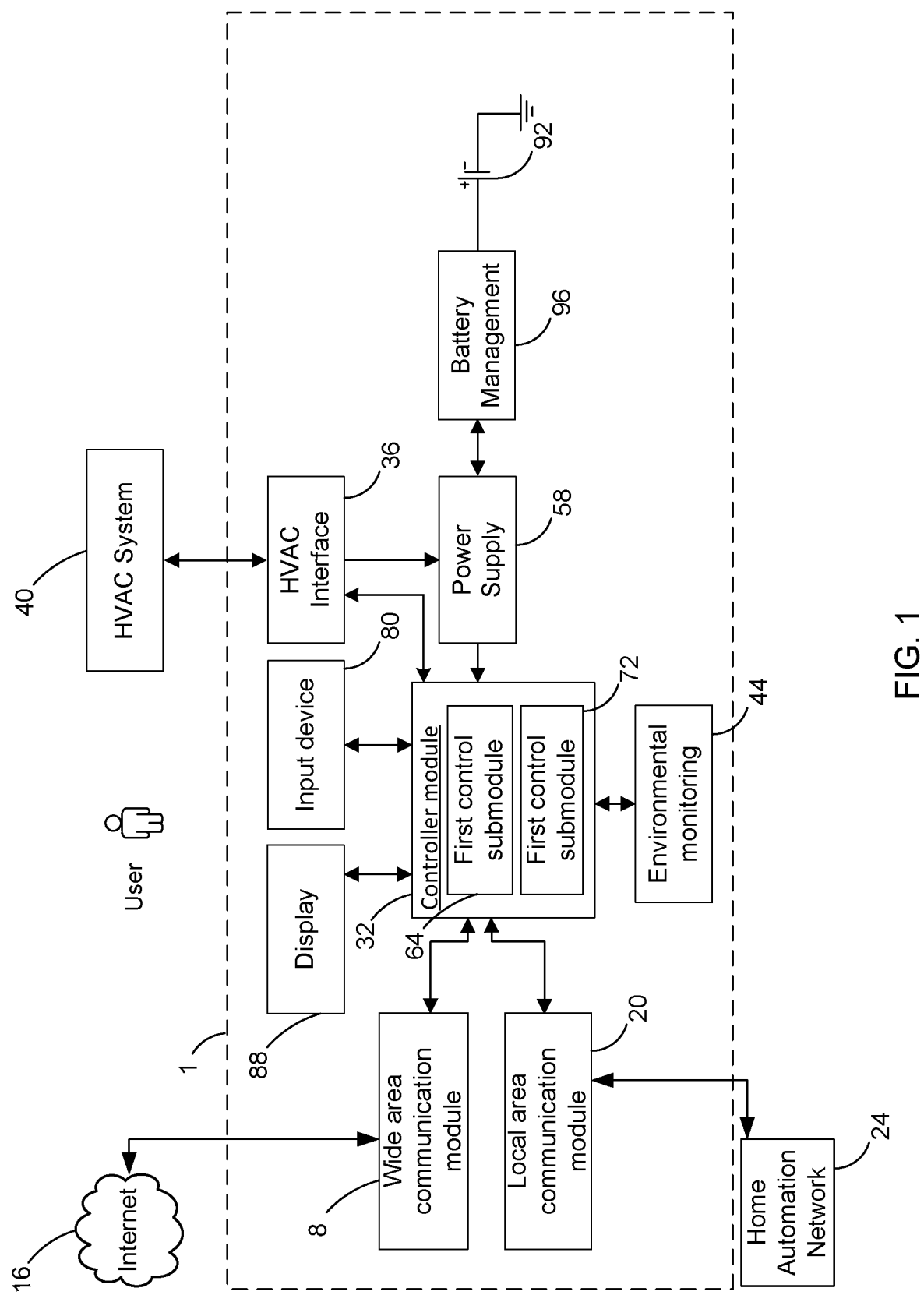
FIG. 1 illustrates a schematic diagram of the operational modules of a thermostat system according to one exemplary embodiment.

The following examples are presented in a non-limiting manner.

For example, according to thermostat systems disclosed herein, the first command is received via the wide-area communication module.

For example, according to thermostat systems disclosed herein, the second command is received via the wide-area communication module.

For example, according to thermostat systems disclosed herein, the thermostat system further comprises a power supply configured to receive current from the external HVAC system via the HVAC interface module, the power supply further supplying electrical power to the rest part of the thermostat.

For example, according to thermostat systems disclosed herein, the thermostat system further comprises a power supply configured to receive current from the external HVAC system via the HVAC interface module, the power supply further supplying electrical power to processor.

For example, according to thermostat systems disclosed herein, the external HVAC system is controlled via the HVAC interface independently of the home automation network.

For example, according to thermostat systems disclosed herein, the thermostat system further comprises at least one environmental sensor for sensing at least one environmental condition; and wherein the processor is further configured for receiving the at least one sensed environmental condition independently of the home automation network.

For example, according to thermostat systems disclosed herein, the processor is further configured for generating a third command for controlling the external HVAC system via the HVAC interface based on the received at least one sensed environmental condition.

For example, according to thermostat systems disclosed herein, the thermostat system further comprises at least one non-environmental device chosen from a surveillance system, a security system and an access control system; and wherein the processor is further configured for receiving the at least one condition monitored by the non-environmental device independently of the home automation network.

For example, according to thermostat systems disclosed herein, the processor is further configured for transmitting the at least one condition monitored by the non-environmental device to a remote device via the wide-area communication module.

For example, according to thermostat systems disclosed herein, the second control signal controls the at least one home automated device according to a home automation network protocol.

For example, according to thermostat systems disclosed herein, the thermostat system further comprises a user input device for inputting a user command for controlling at least one of the external HVAC system or the at least one home automated device via the local communication module.

For example, according to thermostat systems disclosed herein, the thermostat system further comprises an enclosure for housing the HVAC interface module, the wide-area communication module, the local communication module and the processor, the housing having at least one mounting mechanism for mounting onto a vertical wall.

For example, according to thermostat systems disclosed herein, the enclosure has the form factor of a traditional wall-mounted thermostat unit.

For example, according to methods disclosed herein, the first command is received over a wide-area network.

For example, according to methods disclosed herein, the second command is received over a wide-area network.

For example, according to methods disclosed herein, the second control signal is transmitted over a home automation network and wherein transmitting the first control signal to the HVAC system bypasses the home automation network.

For example, according to methods disclosed herein, the method further comprises receiving a sensed environmental condition and transmitting a third control signal being generated based on the received environmental condition, the receiving and the transmitting bypassing the home automation network.

For example, according to methods disclosed herein, the method further comprises receiving a first sensed condition from a first home automated device and receiving a second sensed non-environmental condition from a second home automated device, the receiving of the first condition bypassing the home automation network and the receiving of the second condition via the home automation network.

For example, according to methods disclosed herein, the further comprises transmitting the first sensed condition and the second condition to a remote device via the wide-area communication module.

For example, according to thermostat systems disclosed herein, the processor is further configured for: receiving from the first home automated device a condition sensed by the first home automated device or a status of the first home automated device independently of the home automation network; transmitting the received condition or status of the first home automated device to the external network via the wide-area communication module; receiving from the second home automated device a condition sensed by the first home automated device or a status of the first home automated device via the local communication module; and transmitting the received condition or status of the second home automated device via the wide-area communication module.

For example, according to thermostat systems disclosed herein, the first home automated device is chosen from a HVAC system, a security system, a surveillance system, an access control system and an external environmental monitoring device and the second home automated device is chosen from a HVAC system, a security system, a surveillance system, an access control system, an external environmental monitoring device household appliance, a lighting system and an entertainment device.

For example, according methods disclosed herein, the method further comprises receiving from the first home automated device a condition sensed by the first home automated device or a status of the first home automated device independently of the home automation network; transmitting the received condition or status of the first home automated device to the external network via the wide-area communication module; receiving from the second home automated device a condition sensed by the first home automated device or a status of the first home automated device via the local communication module; and transmitting the received condition or status of the second home automated device via the wide-area communication module.

For example, according to methods disclosed herein, first home automated device is chosen from a HVAC system, a security system, a surveillance system and an access control system and the second home automated device is chosen from a HVAC system, a security system, a surveillance system, an access control system, an external environmental monitoring device household appliance, a lighting system and an entertainment device.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices are directly connected to one another or connected to one another through one or more intermediate elements or devices via an electrical element, electrical signal or a mechanical element depending on the particular context.

"Home automated device" herein refers to a device found within a building that can be at least partially accessed in an automated way. The device may be a piece of equipment in the building that can be operated to effect a change in the condition of the building. The device may be operable to sense one or more conditions of the building, such as one or more environmental conditions. The device may also be any device located within the building and that may be operated in different modes. The home automated device may be controlled to cause a change in an operational mode of the device. Additionally, or alternatively, the home automated device may provide information pertaining to a condition within the building or to a status of the home automated device. For example, a status of the home automated device may be on/off status, usage, or current operational mode. Accessing a home automated device refers to controlling the device, receiving information from the device, or both. It will be understood that while the word "home" has been used, home automated device may also include devices found in residential as well as non-residential buildings (ex: commercial or industrial buildings).

"Automation", "automated" or variants, thereof refers to a way of accessing a device without real-time human intervention. For example, automated access may include where the access of a device is carried out so as to achieve a predefined requirement (ex: achieving a given setpoint). For example, automated access may also include where the access follows a predefined scheme (ex: various setpoints over time).

The expression "home automation network" herein refers to a local area network in which home automated devices and a thermostat system are nodes of the network. The home automated devices communicate with one another or with the accessing devices using a network protocol, such as Ethernet, ZigBee, Z-Wave, Bluetooth or Wi-Fi. The local area network can be wireless, wired or a mixture thereof.

"Networked home automated devices" herein refers to home automated devices that are nodes of the home automation network.

"Directly-connected home automated devices" herein refers to home automated devices that communicate directly with the thermostat system independently of the home automation network. For example, a directly-connected home automated device may be hard-wired with the thermostat system.

Referring now to FIG. 1, therein illustrated is a schematic diagram of the operational modules of a thermostat system 1 according to various exemplary embodiments. The thermostat system 1 may be used within a home automation system to provide centralized access of connected home automated devices.

The thermostat system 1 includes a wide area communication module 8 configured for data communication with an external wide area network 16, such as the Internet. For example, the wide-area communication module 8 may be implemented as a network interface controller, which may be an Ethernet or Wi-Fi module. For example, the wide-area communication module includes a Wi-Fi module. The wide-area communication module may also implement communication protocol, in hardware and/or software, for data communication with the external wide area network 16. The communication protocol may provide transport and/or link layer services, such as TCP/IP.

The thermostat system 1 also includes a local communication module 20 configured for data communication within a local home automation network 24. For example, the home automation network can be a local area network implemented using known technology standards such as Ethernet, Wi-Fi, Bluetooth, ZigBee, Z-Wave or mixture thereof. It will be understood that the local home automation network 24 can communicate with another device within the local home automation network 24 in a one-to-one relationship or via a hub or router.

According to various exemplary embodiments, the wide-area communication module 8 and the local communication module 20 may be implemented as a single module. For example, the single module may be in communication with the networked home automated devices via a hub or router, wherein the hub, router or one of the home automated devices provides communication with the external wide area network 16. For example, a suitable router within a local Ethernet and/or Wi-Fi network provides an internet connection while also allowing communication amongst nodes of the local network.

The thermostat system 1 further includes a controller 32 in signal communication with the wide-area communication module 8 and the local area communication module 20. The controller described herein may be implemented in hardware or software, or a combination of hardware and software. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

The controller 32 is operable to transmit data to and receive data from the wide-area network 16 via the wide area communication module 8. The controller 32 is also operable to transmit data to and receive data from the home automation network 24 via the local area communication module 20.

The thermostat system 1 also includes a HVAC interface module 36. The output side of HVAC interface module 36 can be connected to a HVAC system 40. The HVAC interface module 36 is further operable to control the HVAC system 40. For example, the HVAC interface module 36 may include mechanical, electrical and/or electronic components for making a heating call or cooling call to the HVAC system 40. For example, the HVAC interface module 36 may output HVAC control signals for controlling the HVAC system 40. For example, connection of the HVAC interface module 36 with the HVAC system 40 may be carried out according to known connections, such as using C, R, Rh, Rc, G, W, Y wires. Other connections may be used for more complex HVAC systems, such as heat pumps and multi-stage HVAC systems. For example, the HVAC interface module 36 can further control the HVAC system to provide humidifying and dehumidifying.

The thermostat system 1 may further include at least one environmental monitoring module 44 for sensing at least one condition of the environment surrounding the thermostat system 1. The environmental monitoring module 44 includes at least one physical sensor for sensing the at least one environmental condition. For example, the at least one physical sensor includes a temperature sensor for determining temperature of the environment surrounding the thermostat system 44. The at least one environmental monitoring module 44 is coupled to the controller 32 and the condition sensed by the environmental monitoring module. According to various exemplary embodiments, the thermostat system 1 includes a plurality of environmental monitoring module 44 for sensing one or more of temperature, humidity level, concentration levels of CO, $CO_2$, smoke, formaldehyde, natural gas, VoC, and dust/particles level.

According to one exemplary embodiment, the HVAC interface module 36 may be integrated with other components of the thermostat system 1, such as the controller 32. The HVAC interface module 36, controller 32, wide area communication module 8 and local area communication module 20 may be implemented within an embedded system or as part of a system-on-chip.

Figure 2:
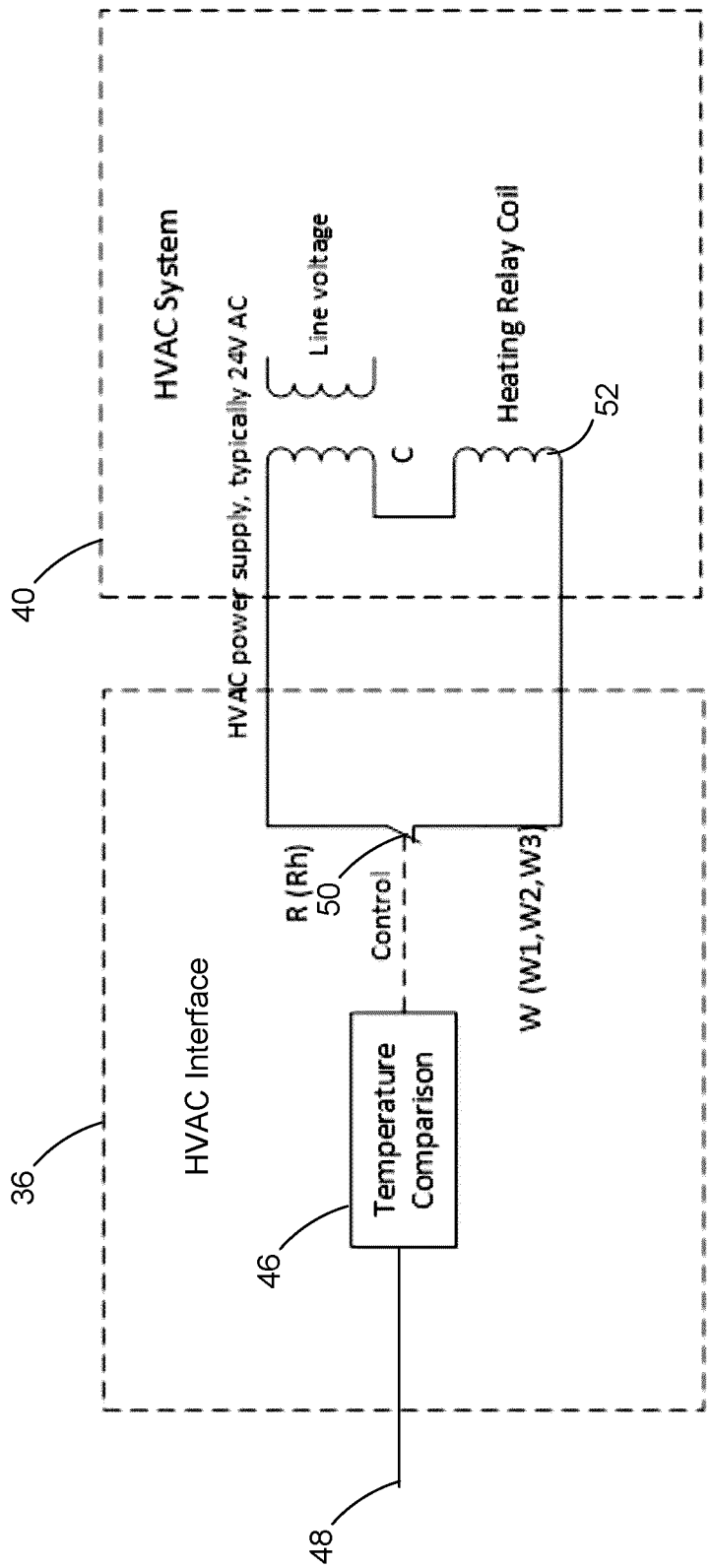
FIG. 2 illustrates a schematic circuit diagram of exemplary operative connections between an HVAC interface module and a HVAC system during a heating call.
Figure 3:
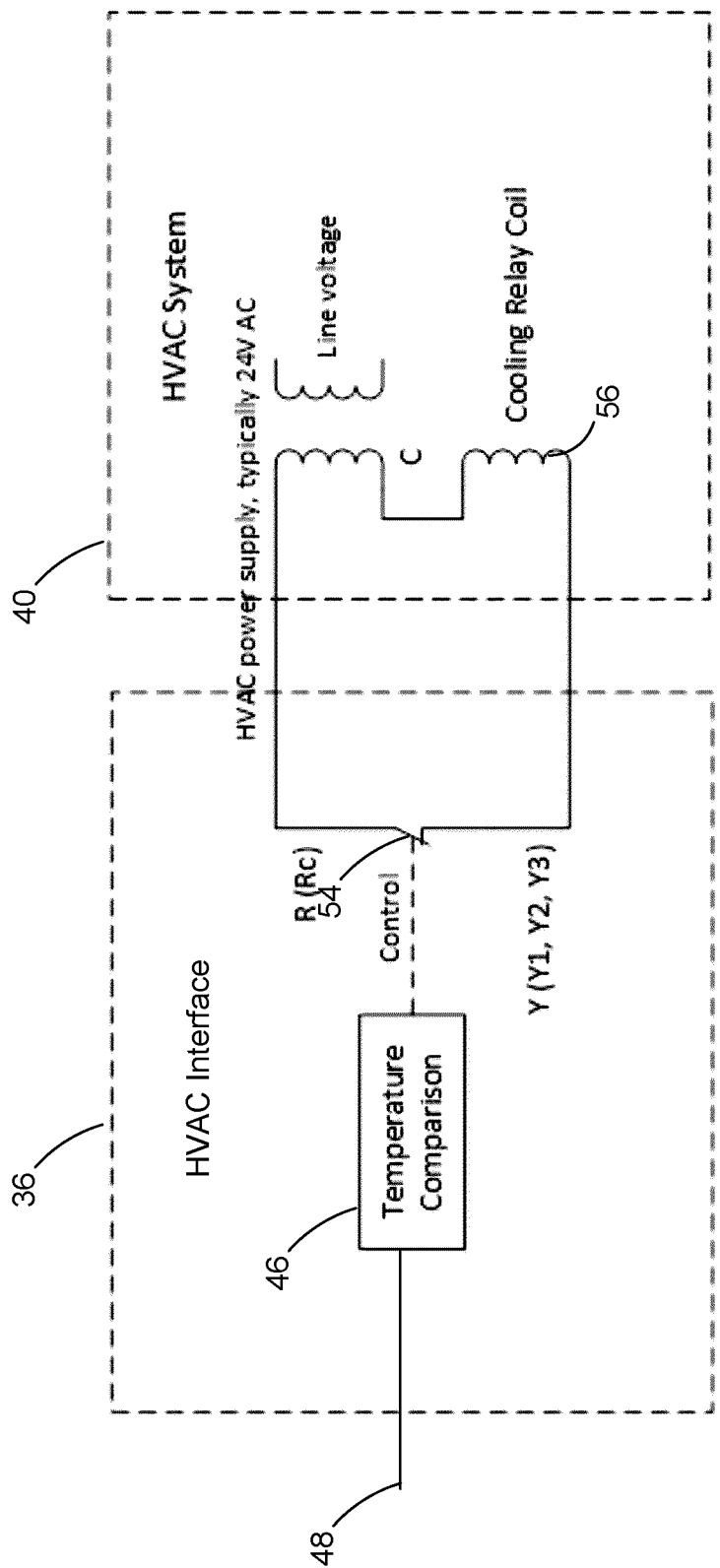
FIG. 3 illustrates a schematic circuit diagram of exemplary operative connections between an HVAC interface module and a HVAC system during a cooling call.

Referring now to FIGS. 2 and 3, therein illustrated are schematic circuit diagrams of operative connections between a HVAC interface module 36 with a HVAC system 40 during a heating call and a cooling call respectively. The HVAC interface module 36 includes a temperature comparator 46 having at least one input 48 for receiving a control signal indicating a desired temperature set point and a current temperature. For example, the current temperature may be sensed by the environmental monitoring module 44. The temperature comparator 46 compares the sensed current temperature with the temperature set point and outputs a control signal to the HVAC system 40. As illustrated in FIG. 2, the temperature comparator 46 can output a signal to drive a heating call relay 50, which causes current to flow through the heating relay coil 52 of the HVAC system 40, thereby causing the HVAC system 40 to begin heating. As illustrated in FIG. 3, the temperature comparator 46 can output a signal to drive a cooling call relay 54, which causes current to flow through the cooling relay coil 56 of the HVAC system 40, thereby causing the HVAC system 40 to begin cooling. Other calls may be possible for more complex HVAC systems. Controlling the HVAC system 40 to operate different leads to a change in environmental conditions within the building.

Referring back to FIG. 1, the thermostat system 1 further includes a power supply 58 for providing electrical power to various components of the thermostat system 1, such as the wide-area communication module 8, the local area communication module 20 and the controller 32. According to one exemplary embodiment, the power supply 58 may draw AC power from a typical 110V/220V mains electricity supply. According to another exemplary embodiment, the power supply 58 draws electric power from the HVAC system 40, which may typically be 24V AC.

The controller 32 includes a first control submodule 64 configured to access the HVAC interface module 36. The first control submodule 64 can generate one or more control signals for accessing the HVAC system 40 via the HVAC interface 36. For example, the first control submodule 64 can generate a control signal to change the temperature setpoint for the HVAC system 40. For example, the first control submodule 64 can also generate a control signal to change the humidity setpoint for the HVAC system 40.

According to various exemplary embodiments, the first control submodule 64 in combination with the HVAC interface module 36 can receive data information pertaining to an environmental condition, such as temperature and/or humidity level and control the HVAC system based on the received information. The environmental condition may be received from the environmental monitoring module 44. The control may be performed exclusively by the first control submodule 64, exclusively by the HVAC interface module 36 or a combination of both the first control submodule 64 and the HVAC interface module 36. For example, the first control submodule 64 may send control signals to the HVAC interface module 36 to set a temperature set point and/or humidity set point. This temperature set point and/or humidity set point may be selected based on a user-inputted command or a preprogrammed schedule. The HVAC interface 36 can further control various relays of the HVAC system 40 for heating, cooling, humidifying or dehumidifying based on the received temperature set point and/or humidity set point.

In some further examples, the first control submodule 64 and/or the HVAC interface module 36 can monitor indoor air quality, such as concentration levels of CO, $CO_2$, smoke, formaldehyde, natural gas, VoC and dust/particles level and appropriately control the HVAC system 40 to improve the air quality. For example, the environmental monitoring module 44 can monitor such environmental conditions.

Data information pertaining to one or more environmental conditions may be received from the internal environmental monitoring module 44 of the thermostat system (if provided). Alternatively, data information pertaining to one or more environmental conditions may be received from environmental monitoring devices directly connected to the thermostat system 1 and/or network-connected to the thermostat system 1, as described hereinbelow.

The controller 72 includes a second control submodule 72 configured to access home automated devices that are network connected to the thermostat system 1. The second control submodule 72 can also generate one or more control signals for controlling one or more network connected home automated devices that are operable to be controlled. The control signals generated for each controllable network connected home automated device may depend on the type of that home automated device.

According to various exemplary embodiments, as a given home automated device is connected to the thermostat system 1 via the home automation network 24, the second control submodule 72 can be programmed so as to become configured to generate control signals that correspond to the properties of the given home automated device 1. For example, where the given home automated device is a dimmable light, the second control submodule 72 can be programmed with a light control submodule for controlling the light to different brightness levels.

According to various exemplary embodiments, the thermostat system 1 includes an input device 80 and a display 88. For example, the input device 80 can be a keypad, mouse, voice recognition, stylus, and/or a touchscreen. In the case of a touchscreen, the input device 80 is integrated with the display 88. The input device 80 can be manipulated by a human user to enter commands. Commands inputted by the user can be received at the controller 32.

Where the command is for controlling the HVAC system 40, the first control submodule 64 can generate a control signal based on the received command. In particular, the command can be for changing an environmental setting (ex: desired temperature and/or humidity) and the first control submodule 64 can at least generate a control signal based on the received command for controlling the HVAC system 40 via the HVAC interface 32.

Where the command is for controlling a network connected home automaton device, the second control module 72 can generate a control signal based on the received command and further based on the programming of the second control module 72 storing properties of the given network connected home automated device. The generated control signal can then be transmitted via the local communication module 20 and over the home automation network 24 to control the given home automated device. For example, the command can be for changing a non-environmental setting.

Where the second control submodule 72 is programmed based on a given home automated device being added to the home automation network 24 and being connected to the thermostat system 1, the second control submodule 72 can be further programmed to display on the display 88 a user interface having various elements that can be manipulated by a user, such as buttons, sliders, etc. The elements displayed may be specific to properties of the given home automaton device so that a user can easily provide control commands specific to the home automated device. For example, programming the second control submodule 72 may be installing software or adding an "app" specific to the given home automated device.

The control module 32 can further receive over the wide-area network 16, such as the internet, one or more commands for accessing one or more of the home automated devices. The one or more commands are received via the wide-area communication module 8. The commands may be inputted using a user-operable device connected to the wide-area network, such as computer or mobile device (ex: tablet, smartphone). The command may also be generated from a predetermined control scheme stored on a device connected to the wide-area network. For example, the control scheme can be predefined by a user, such as via a web portal, and saved to a server. The server can then send the commands over the wide-area network 16 to the control module 8.

Where the command received over the wide-area network is for controlling the HVAC system 40, the first control submodule 64 can generate a control signal based on the received command.

Where the command received over the wide-area network 16 is for accessing a network connected home automated device, the second control submodule 72 can generate a control signal based on the received command. It will be appreciated that the thermostat system 1 having the wide-area communication module and the local area communication module act as a network gateway between the wide-area network 16 and a network connected automation device. That is, the thermostat system 1 provides a bridge between the wide-area network 16 and the home automation network 24. More particularly, the thermostat system 1 is operable to translate network protocols of the wide-area network 16 to network protocols of the home automation network 24, and vice versa.

It will be appreciated that the HVAC system 40 is connected to the thermostat system 1 while bypassing the home automation network connection 24. Therefore, the HVAC system 40 can be controlled independently of the home automation network 24. That is, the HVAC system can be controlled without using the home automaton network 24.

In the example of FIG. 1, the HVAC interface 36 is included within the thermostat system 1. Control signals generated by the first control submodule 64 follow a signal path to the HVAC system 40 via the HVAC interface 36 while bypassing the home automation network connection 24. Therefore, it is possible to operate the thermostat system 1 to control the HVAC system 40 without requiring a home automation network 24 or a wide-area network connection 16. Alternatively, the wide-area network connection 16 can be used to receive commands from a remote device over the wide area network 16 to control the HVAC system 40 or send data to the remote device over the wide area network 16, while still not requiring a home automation network 24. However, the availability of the local communication module 20 and the second control module 72 allows the thermostat system 1 to be scalable. More particularly, the thermostat system 1 is scalable in that access of additional home automated devices with the thermostat system 1 can be provided by making use of the second control submodule 72, the local area communication module 20 and the home automation network 24. The additional home automated devices may be added as network connected home automated devices to provide scalability.

Continuing with FIG. 1, according to various exemplary embodiments, the thermostat system 1 may further include a battery 92 and a battery management module 96. According to some exemplary embodiments, the battery management module 96 can be configured to cause the battery 92 to provide electric power to components of the thermostat system 1 when there is a power outage, or boost current supply when the power from the HVAC system 40 is limited.

Figure 4:
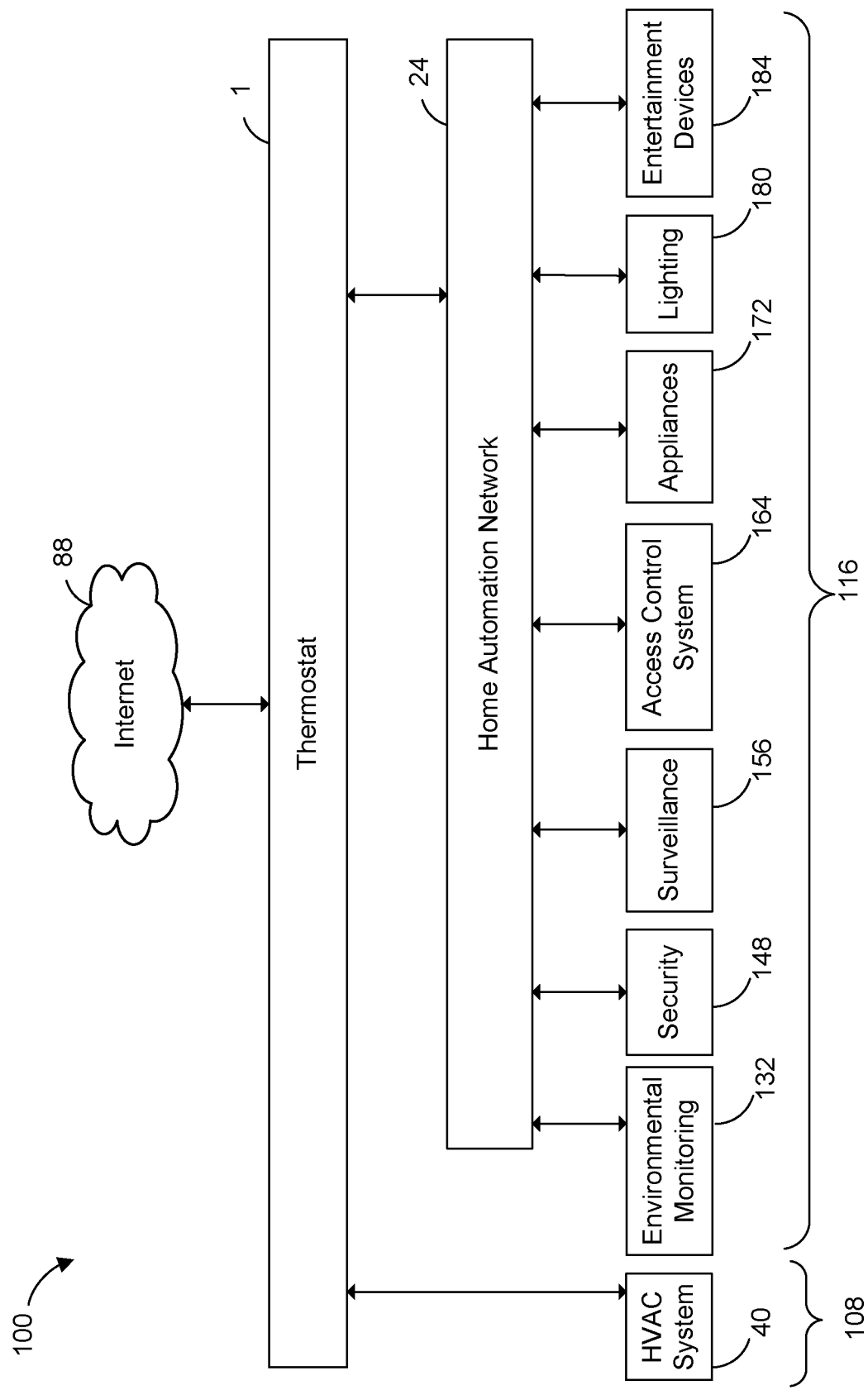
FIG. 4 illustrates a schematic diagram of a home automation system according to one exemplary configuration.

Referring now to FIG. 4, therein illustrated is a schematic diagram of a home automation system 100 according to one exemplary configuration. The system 100 includes a thermostat system 1 providing centralized access to a plurality of home automated devices.

The thermostat system 1 is operable to communicate with home automated devices according to a two-tier scheme. The two tier scheme herein refers to the thermostat system 1 being differently coupled to the plurality of home automated devices so as to communicate with home automated devices in at least two different ways.

In the first tier, at least one home automated device 16 forming a first subset of the plurality of home automated devices 108 is directly connected to the thermostat system 1. For example, the directly connected home automated device 108 is connected to the thermostat system 1 in a star data communication relationship. For example, the at least one directly connected home automated device is in data communication with the thermostat system 1 while bypassing the home automaton network 24. Since the thermostat system 1 includes an internal HVAC interface 36 allowing the thermostat system 1 to be directly connected to the HVAC system 40, the HVAC system 40 may belong to first subset of home automated devices 108. For example, and as illustrated, the first subset of directly connected home automated devices includes only the HVAC system 40.

In the second tier, at least another one home automated device may form a second subset of the plurality of home automated devices and may be connected to the thermostat system 1 via the home automation network 24. The home automated devices belonging to the second subset are each a network connected home automated device 116. The second control module 72 of the thermostat system 1 is operable to generate control signals, which are transmitted over the home automation network 24 to one or more of the network connected automated home devices 116 of the second subset. The one or more network connected automated home devices 16 receiving the control signals are then controlled accordingly. For example, the control signals control the one or more network connected home automated devices according to a home automation network protocol. The home automation network protocol may be a known or standard protocol, such as X10, ZigBee, Z-Wave, Bluetooth. For example, and as illustrated, the networked home automated devices connected to the home automation network 24 may include at least one external environmental monitoring device 132, a security system 148, a surveillance system 156, an access control system 164, at least one appliance 172, at least one lighting device 180 and at least one entertainment device 184.

The external environmental monitoring device 132 may include one or more sensors for sensing one or more conditions. The plurality sensors may be provided in one device, or a plurality of devices. The sensed conditions may include temperature, humidity level, concentration levels of CO, $CO_2$, smoke, formaldehyde, natural gas, VoC, dust/particles level, UV light level (ex: UVA or UVB), water inundation, earthquake detection, etc.

It will be appreciated that the at least one home automated device 108 belonging to the first subset of devices can be in signal communication with the thermostat system 1 independently of the home automation network 24. That is, the directly connected home automated device can be accessed by the thermostat system 1 independently of the operation of the home automation network 24. For example, in some cases, the thermostat system 1 can be operable to control the at least one devices of the first subset of devices even where a home automation network 24 is not provided. That is, the home automated devices may all belong to the first subset and the second subset does not have any members.

Continuing with FIG. 4, the thermostat system 1 is further operative to transmit and receive data over a wide area network 16, such as the Internet. It will be appreciated that the thermostat system 1 acts as a gateway for the network connected home automated devices 116 to the wide area network 16.

Figure 5:
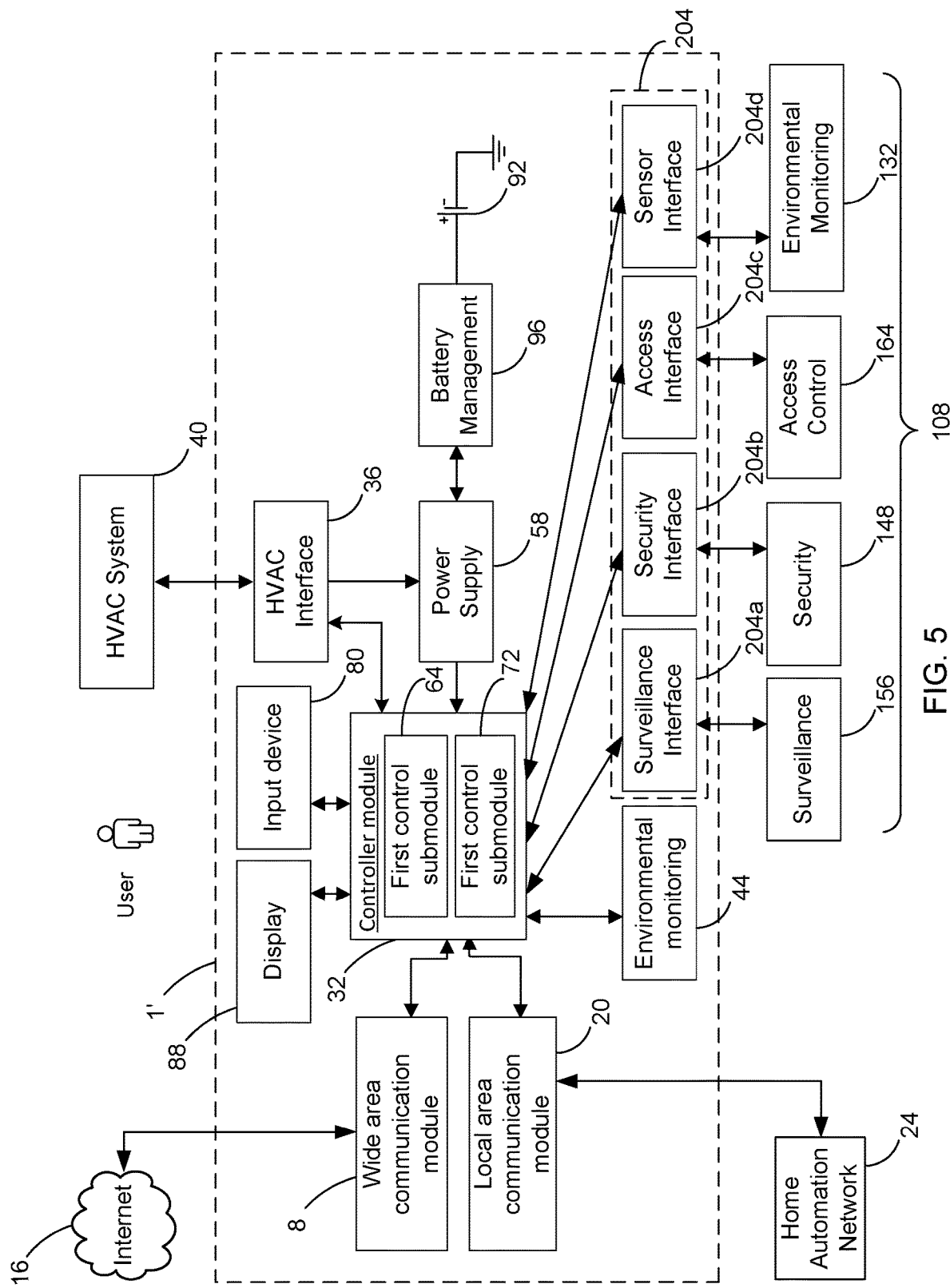
FIG. 5 illustrates a schematic diagram of the operational module of a thermostat system according to one variant exemplary embodiment.

Referring now to FIG. 5, therein illustrated is a schematic diagram of a thermostat system 1' according to an exemplary variant of the thermostat system 1 illustrated in FIG. 1. The thermostat system 1 of FIG. 5 is similar to that of FIG. 1 but further includes at least one additional device interface 204 that is coupled to the control module 32. The device interface 204 can be directly connected to one or more home automated devices. For example, each device interface 204 is directly connected to one home automated device. For example, at least one of the device interfaces 204 may be preconfigured according to a type of home automated device to be connected to that interface. For example, the device interface 204 may have an interface board implemented in hardware, which may be updated via firmware.

The at least one additional device interface 204 is in data communication with the controller 32. Accordingly, the controller 32 may be operable to generate a control signal, which can be transmitted to at least one of the directly connected home automated devices via the at least one additional device interface 204. Similarly, the controller 32 may be operable to receive data from at least one of the directly connected home automated devices via the at least one additional device interface 204. The received data may provide information about a status or condition of a home automated device connected via a device interface 204.

The at least one additional device interface 204 may be connected to typical devices that will be included in the home. For example, these typical devices may be ones that are centrally connected within the building. Such devices may include a surveillance system, an alarm system, a building access system, and various environmental sensors (ex: thermometer, barometer, humidity level detector). As illustrated, the exemplary thermostat system 1' includes a surveillance interface 204a for accessing the surveillance system 156, a security interface 204b for accessing a security system 148, an access interface 204c for accessing a building access control system 164 and a sensor interface 204d for accessing one or more external monitoring devices 132. For example, the external monitoring devices 132 provide sensing of environmental conditions other than those sensed by the internal environmental monitoring system. Alternatively, or additionally, the external monitoring devices 132 can monitor conditions at locations remote of thermostat system 1, such as another room of the building or outside the building (i.e. multi-zone sensing/monitoring).

According to one exemplary embodiment, the first control submodule 64 may be further operable to access (control and receive information) for one or more of the directly connected home automated devices in communication with the controller 32 via one or more of the device interfaces 204. For example, the first control submodule 64 may be preprogrammed according to home automated devices that are expected to be directly connected to the thermostat system 1'.

Figure 6:
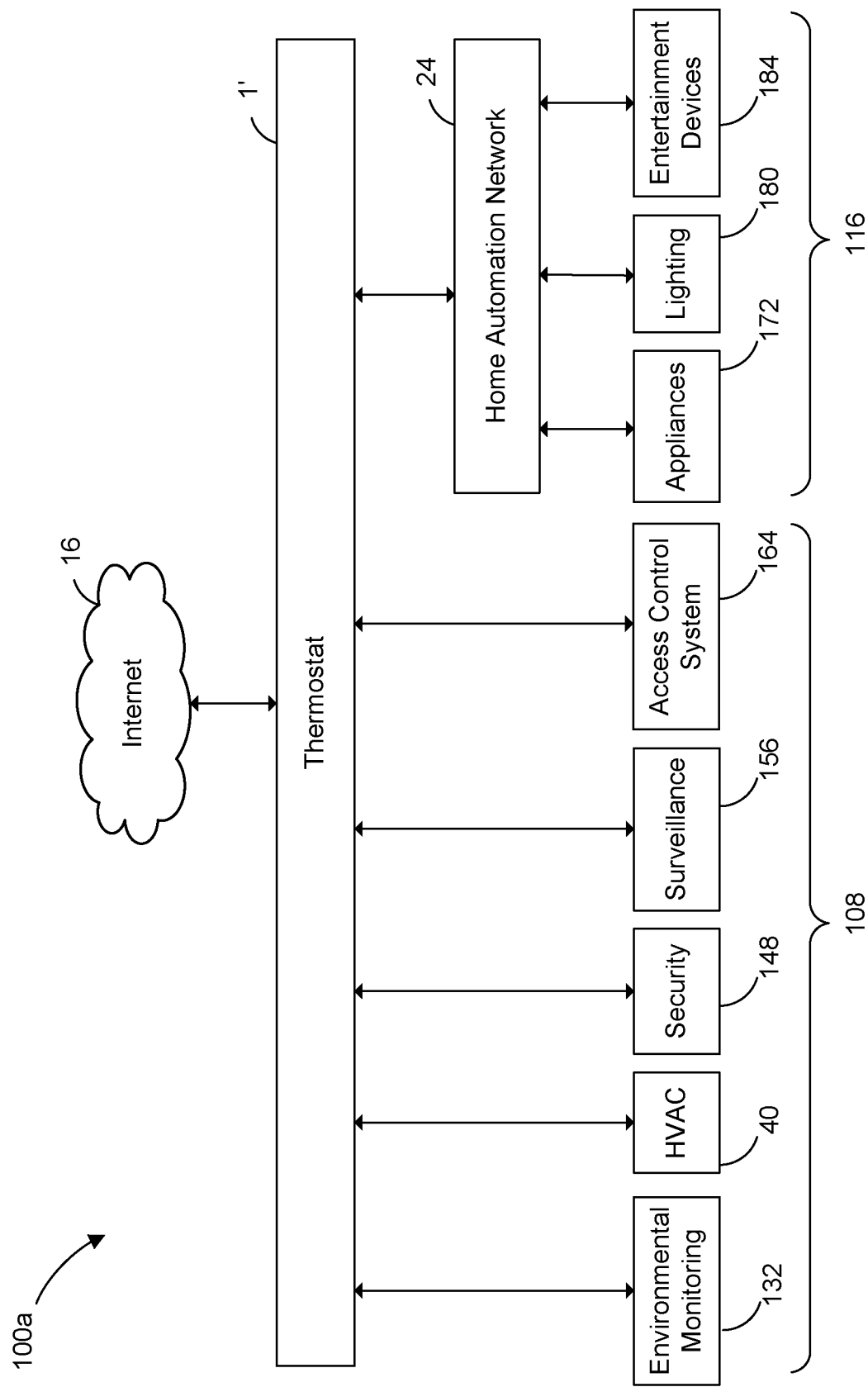
FIG. 6 illustrates a schematic diagram of a home automation system according to one exemplary configuration.

Referring now to FIG. 6, therein illustrated is a schematic diagram of a home automation system 100a according to another exemplary configuration. As illustrated, the home automation system 100a includes the thermostat system 1' having at least one addition device interface 204 as described herein with reference to FIG. 5. It will be appreciated that in the home automation system 100a, the first subset of home automated devices 108 being directly connected to the thermostat system 1' has more than one member. As illustrated, and consistent with FIG. 5, the first subset of home automated devices 108 being directly connected to the thermostat system 1' includes the external environmental monitoring device 132, the HVAC system 40, the security system 148, the surveillance system 156 and the access control system 164. Being directly connected with the thermostat system 1', each of the directly connected home automated devices 108 may be accessed by the thermostat system 1' independently of the home automation network 24. That is, the thermostat system 1' is in communication with each of the directly connected home automated devices 108 while bypassing the home automation network 24.

Figure 7:
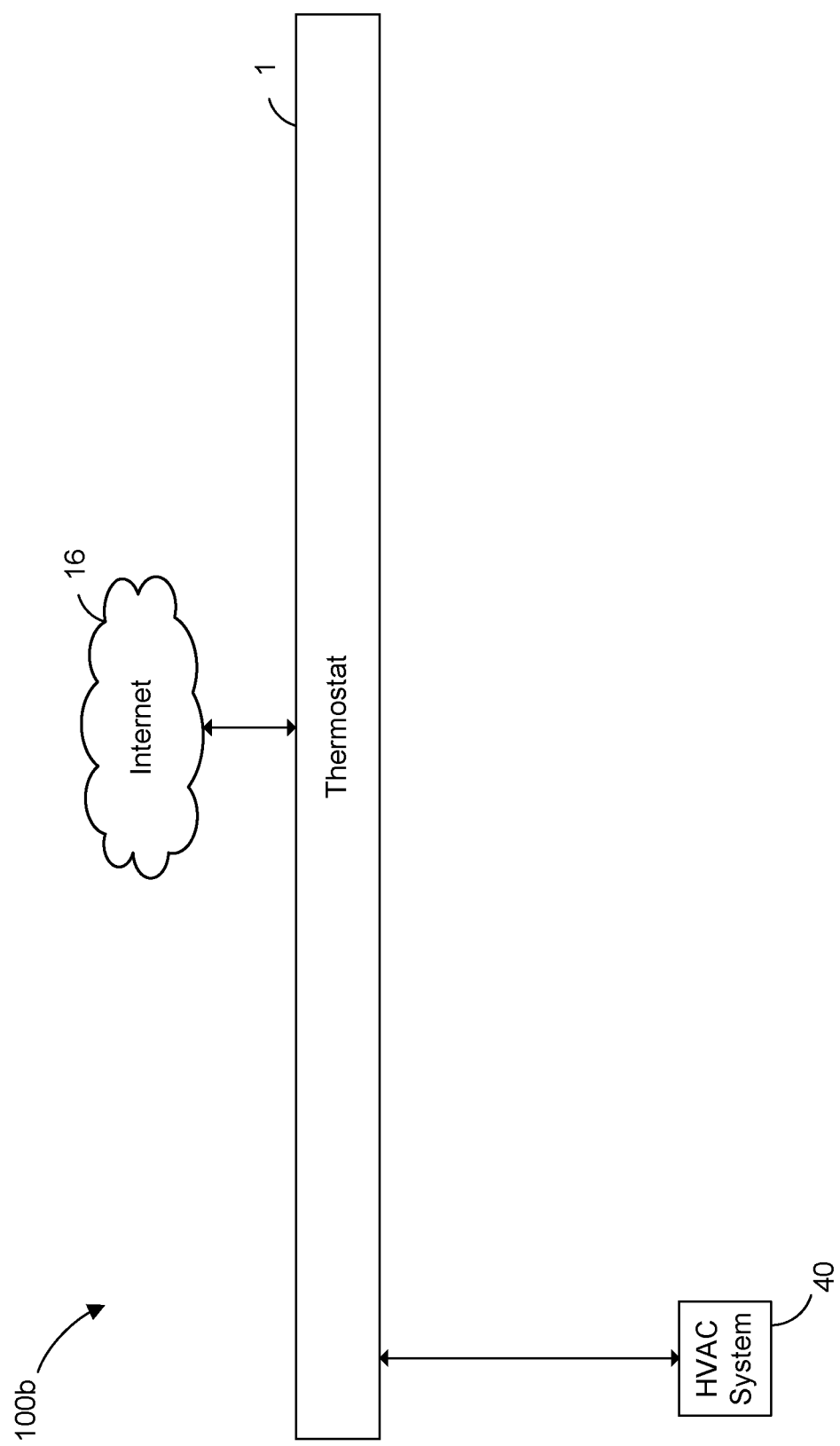
FIG. 7 illustrates a schematic diagram of a home automation system according to one exemplary configuration.

Referring now to FIG. 7, therein illustrated is a schematic diagram of a home automation system 100b according to yet another exemplary configuration. The home automation system 100b may include either one of the thermostat system 1 described herein with reference to FIG. 1 or the thermostat system 1' described herein with reference to FIG. 5. As illustrated, only the HVAC system 40 is provided within the home automation system 100b. It will be appreciated that the providing of the internal HVAC interface 36 within the thermostat system 1 allows it to be used in a way that resembles a traditional thermostat. For example, where a connection to the wide area network is not provided, a user can input commands or provide a preprogrammed HVAC control schedule using the user input device 80 of the thermostat, and the thermostat system 1 can be operable to control the HVAC system 40 according to the inputted command or preprogrammed system. For example, where a connection to the wide-area network 16 is provided, commands or HVAC control schedule may be inputted by the user using a suitable device via the wide-area network 16. Information pertaining to the HVAC system 40 may be further received by the user device over the wide-area network 16.

Figure 8:
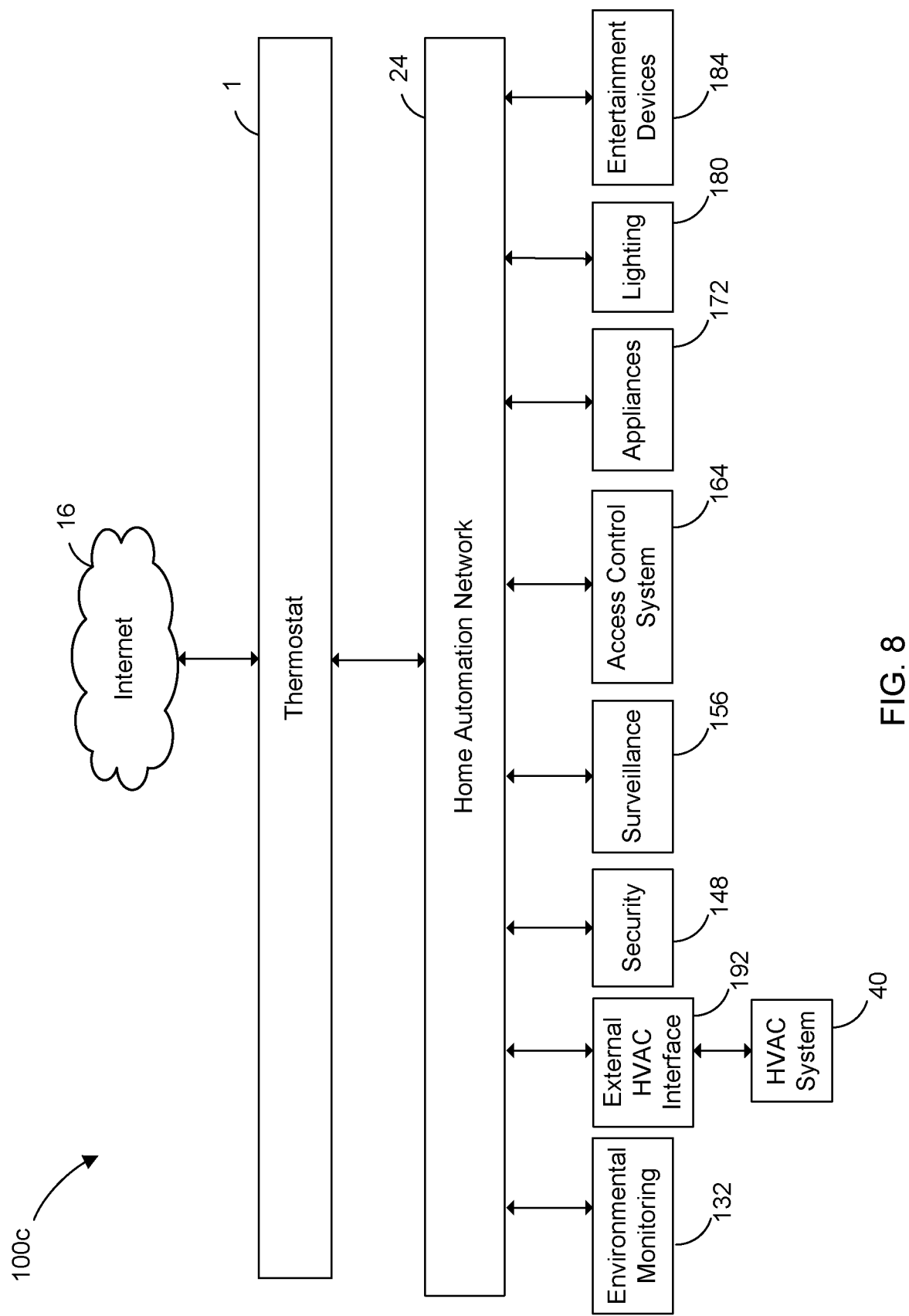
FIG. 8 illustrates a schematic diagram of a home automation system according to one exemplary configuration.

Referring now to FIG. 8, therein illustrated is a schematic diagram of a home automation system 100c according to yet another exemplary configuration. According to this exemplary configuration, each of the home automated devices of the home automation system 100c is a network connected home automated device 116 that communicates with the thermostat system 1 or variant thermostat system 1' via the home automation network 24. An external HVAC interface 192 is provided to generate signals for the HVAC system 40. That is, the external HVAC interface 192 is hardwired to the HVAC system 40, while being accessed by the thermostat system 1 via the home automation network 24. For example, this configuration may be used where the thermostat system 1, 1' is being provided within an already existing home automation network 24 that included an external HVAC interface 192.

Figure 9:
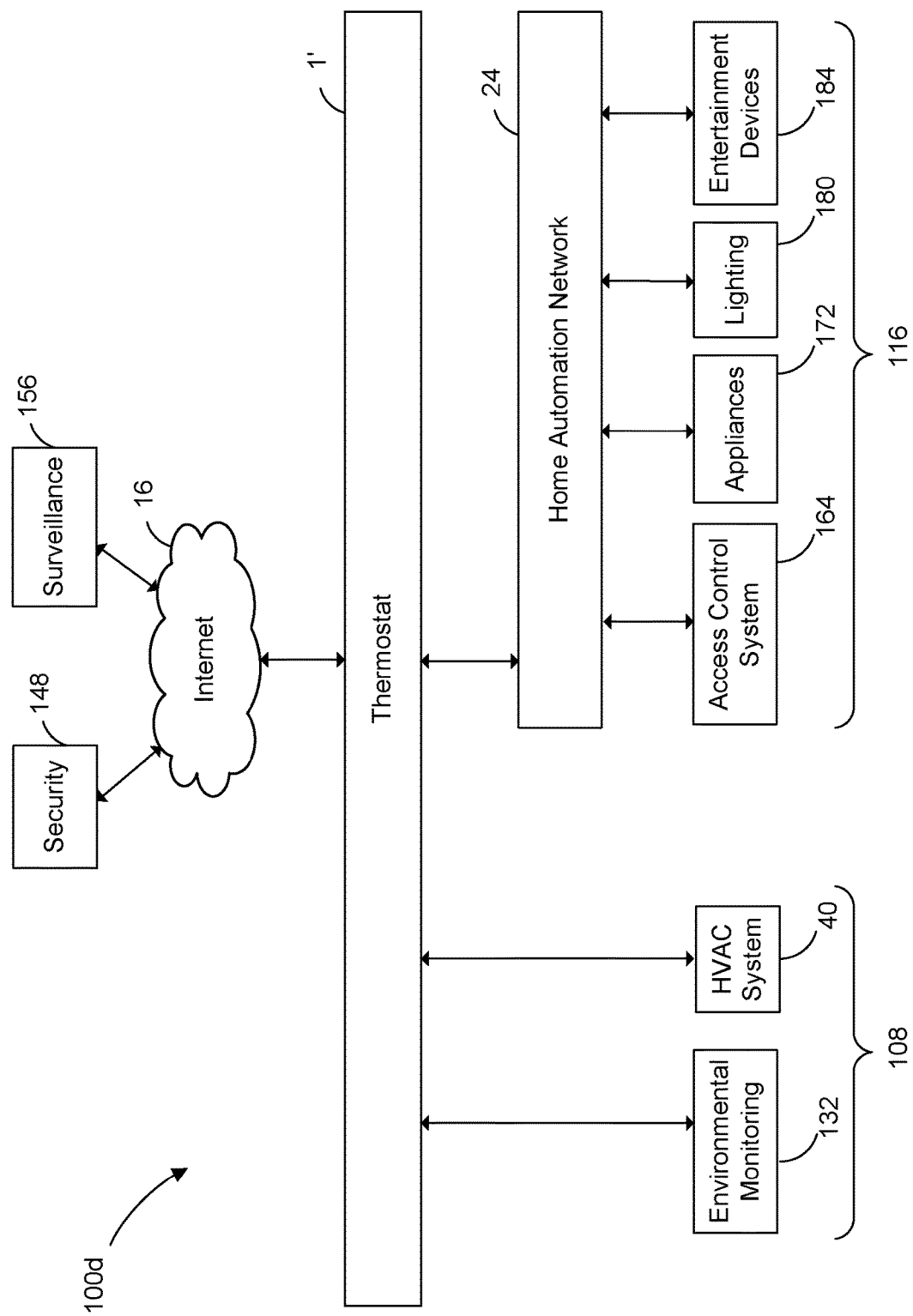
FIG. 9 illustrates a schematic diagram of a home automation system according to one exemplary configuration.

Referring now to FIG. 9, therein illustrated is a schematic diagram of a home automation system 100d according to yet another exemplary configuration. According to this exemplary configuration, the home automated devices are in communication with the thermostat system according to a three-tier scheme. While the variant thermostat system 1' is illustrated, it will be understood that the thermostat system described with reference to FIG. 1 may also be used within the three-tier scheme.

As illustrated, the first subset of the home automated devices includes the external environmental monitoring device 132 and the HVAC system 40. These home automated devices are directly connected home automated devices 108 and represent the first tier of communication with the thermostat system.

The second subset of the home automated devices includes the access control system 164, appliances 172, lighting device 180 and entertainment 184. These home automated devices are networked connected home automated devices 116 that communicate with the thermostat system 1' via the home automation network 24 and represent the second tier of communication with the thermostat system.

The third subset of the home automated devices include at least one device that communicate with the thermostat system via the wide area network 16 and represent the third tier of communication with the thermostat system. For example, the at least one home automated device of the third subset is not operable to communication over a home automation network 24 (ex: does not have appropriate network protocol). Alternatively, the at least one home automated device of the third subset is located at a distance from the thermostat system 1 that is greater than the maximum operational range of the network protocol of the home automation network. However, the thermostat system may still access the at least one home automated device of the third subset via the wide-area network 16. As illustrated, and for example purposes, the security system 148 and the surveillance system 156 are connected to the thermostat system via the internet 16. For example, the thermostat system 1 can receive a status of the security system, which can be further displayed on the display 88 of the thermostat system 1. For example, a video stream of video captured by the surveillance system 156 may be displayed on the display 88 of the thermostat system 1.

In many cases, users are primarily concerned with a higher level of automated control of the HVAC system while being less interested in automation of other devices within the house. Accordingly, these users may be interested in acquiring an automated thermostat system without having to acquire a full featured home automation system. Advantageously, the thermostat system 108 described herein according to various exemplary embodiments is ready to use as a thermostat for controlling the HVAC system.

However, such users may at a later stage be interested to progressively add more automation of other devices within the building. Advantageously, the local area communication module 132 and the second control module 128 of the thermostat system 108 described herein according to various exemplary embodiments may be used to provide automated control of additional home automated devices 16 via a home automation network 24.

It will be appreciated that various exemplary thermostat systems described herein allow for flexible configuration of a home automation system. Furthermore, the thermostat system is configured to access home automated devices in at least two ways. Moreover, the thermostat system is configured to make available to a user information pertaining to the home automated devices in various ways.

For example, environmental conditions surrounding the thermostat system can be sensed using the internal environment monitoring module 32. According to some embodiments, environmental conditions can also be sensed using a directly connected environment monitoring module 132. According to yet other embodiments, environmental conditions can be sensed using a network connected environmental monitoring module 132. In each case, the information may be displayed on the display 88 of the thermostat system 1 and/or transmitted to a remote user device via the wide area communication module 8.

For example, various exemplary thermostat systems are configured to be hardwired to a HVAC system 40. As described, the HVAC system 40 can be accessed independently of a home automation network. The thermostat system is also configured to control HVAC system 40 by accessing an external HVAC interface module 192 via the home automation network 24. In each case, commands for controlling the HVAC system may be inputted using the user input device 80 of the thermostat system and/or transmitted from a remote user devices to the thermostat system via the wide-area network 16.

For example, and as described, various exemplary thermostat systems are configured to access one or more home automated devices that pertain to non-environmental conditions. As described herein, these home automated devices may be accessed according to a three-tier access. In the first tier, one or more home automated devices may be directly connected to the thermostat system to be controlled by and/or provide information to the thermostat system. In the second tier, one or more home automated devices may be networked connected to the thermostat system to be controlled by and/or provide information to the thermostat system. In the third tier, one or more home automated devices may be connected to the thermostat system to be controlled by and/or provide information to the thermostat system via the wide-area network 16. In each case, information pertaining to one or more non-environmental home automated devices may be displayed on the display 88 of the thermostat system 1 and/or transmitted to a remote user device via the wide area communication module 8. Similarly commands for controlling one or more non-environmental home automated devices may be inputted by a user using the user input device 80 and/or transmitted from a remote user device to the thermostat system via the wide-area network 16.

Figure 10:
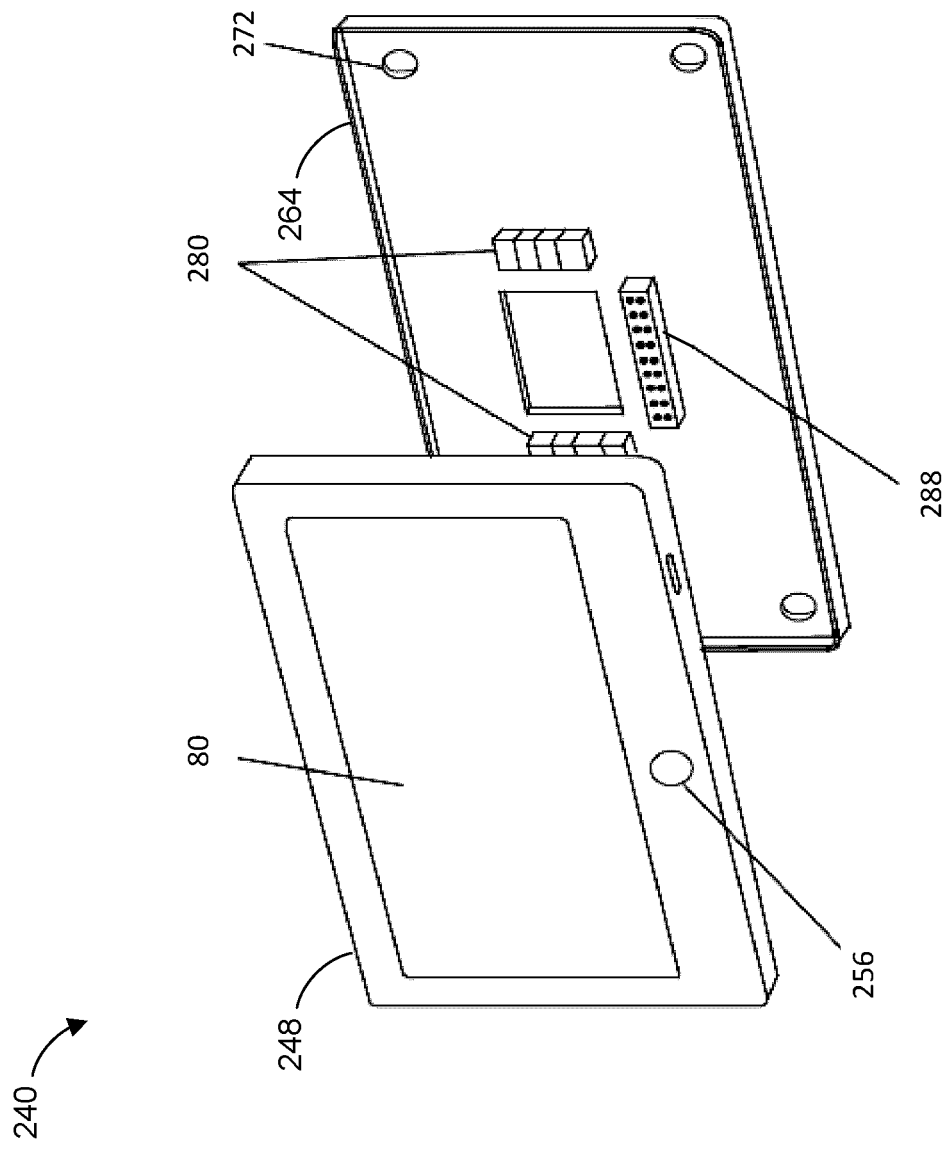
FIG. 10 illustrates an exploded view of a thermostat system being provided in an enclosure according to one exemplary embodiment.

Referring now to FIG. 10, therein illustrated is a perspective view of a packaged thermostat system 1 having been packaged within an enclosure 240 according to various exemplary embodiments. For example, and as illustrated, the enclosure 240 has a form factor that is similar to the form factor of a traditional thermostat. The enclosure 240 includes a face plate 248 having the display 80, which may be a touchscreen providing the user input device 88. The face plate 248 may further include an occupancy sensor 256 for detecting the presence of a human user. For example, various operations of the thermostat system 1 may be controlled based on whether the presence of the human user is detected.

The enclosure 240 further includes a back panel 264. The back panel 264 includes mounts 272 for receiving fasteners for mounting the back panel 264 onto a vertical surface, such as the surface of the wall. Accordingly, the enclosure 240 may be mounted onto a vertical wall like a traditional thermostat. The back panel 264 further includes one or more HVAC wire connectors 280, which provide the physical connection of the wires of the HVAC system 40 with the ports of the HVAC interface 36.

The back panel 264 further includes a board-to-board connector 288 for electronically connecting hardware components provided on the back panel 264 with the hardware components provided on the front panel 256. For example, the hardware components on which the thermostat system 1 is implemented may be provided on the front panel 256, on the back panel 264 or dispersed amongst the front panel 256 and the back panel 264. The board-to-board connector 288 provides communication between the components on the front panel 240 and the back panel 264 as well as power.

Figure 11:
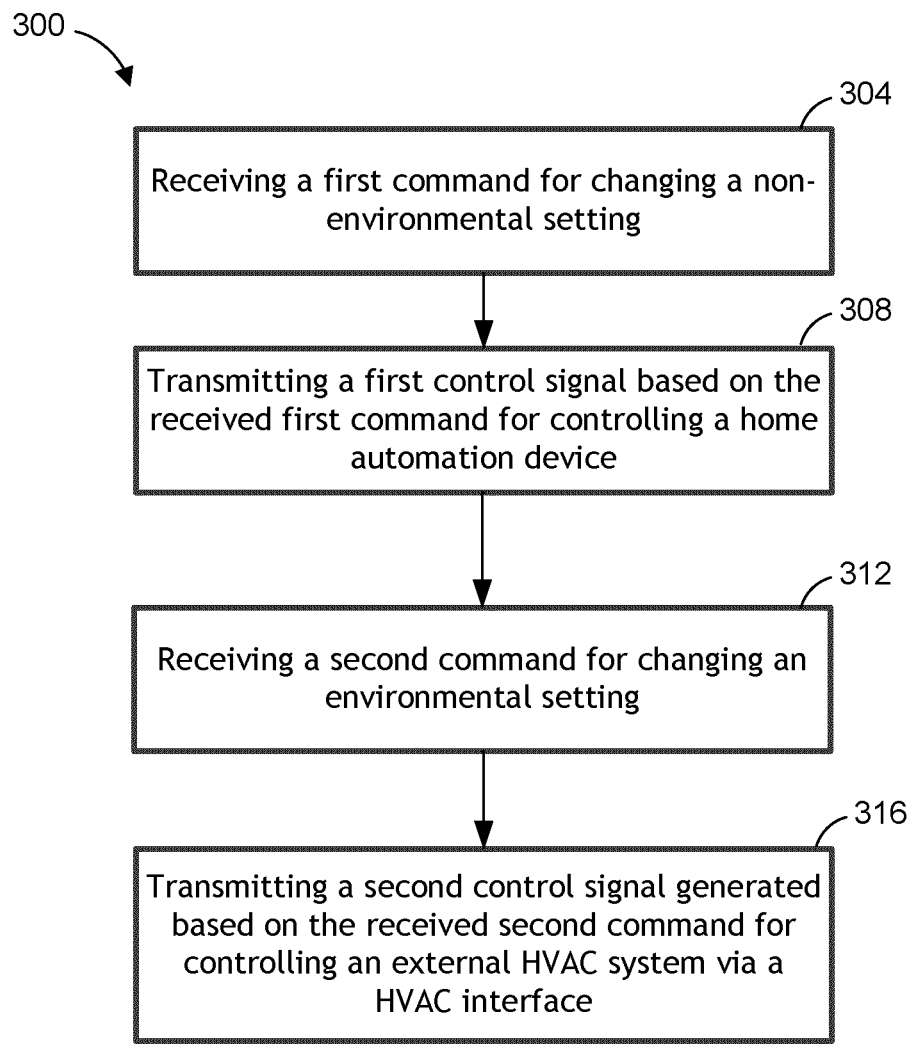
FIG. 11 illustrates a flowchart showing the operational steps of an exemplary method for accessing at least one home automated device.

Referring now to FIG. 11, therein illustrated is a flowchart showing the operational steps of a method 300 for controlling at least one home automated device. For example, the method may be carried out on the thermostat system 1 or 1' described herein. At step 304, a first command for changing a non-environmental setting is received at the thermostat system 1 for changing a non-environmental setting. The first command may have been inputted via the user input device 80 or using a remote device over the wide area network 16.

At step 308, a first control signal for controlling a home automated device is generated based on the received first command and the first control signal is further transmitted to the home automated device.

At step 312, a second command is received at the thermostat system 1 for changing an environmental setting. The first command may have been inputted via the user input device 80 or using a remote device over the wide area network 16.

At step 316, a second control signal for controlling a HVAC system 40 is generated based on the received command and the second control signal is further transmitted to the HVAC system via a HVAC interface.

For example, the first command is received over a wide-area network, such as the internet, from a remote device.

For example, the second command is received over a wide-area network, such as the internet, from a remote device.

For example, the first control signal is transmitted over a home automation network while the second control signal is transmitted to the HVAC system over a path that bypasses the home automation network.

For example, the method may further include receiving a sensed environmental condition over a path that bypasses the home automation network. This may be from the internal environmental monitoring module 44 or a directly connected external environmental monitoring device 132. The method may further comprise transmitting a third control signal for controlling the HVAC system. The third control signal may be generated based on the environmental condition and transmitted over a path that bypasses the home automation network.

For example, the method may further include receiving a first sensed condition from a first home automated device over a path that bypasses the home automation network. For example, the first home automated device is a directly connected home automated device. The method may further include receiving a second sensed condition from a second home automated device via the home automation network. For example, the second home automated device is a network connected home automated device. The method may further include transmitting both the first sensed condition and the second sensed condition to a remote device over the wide-area network.

Figure 12:
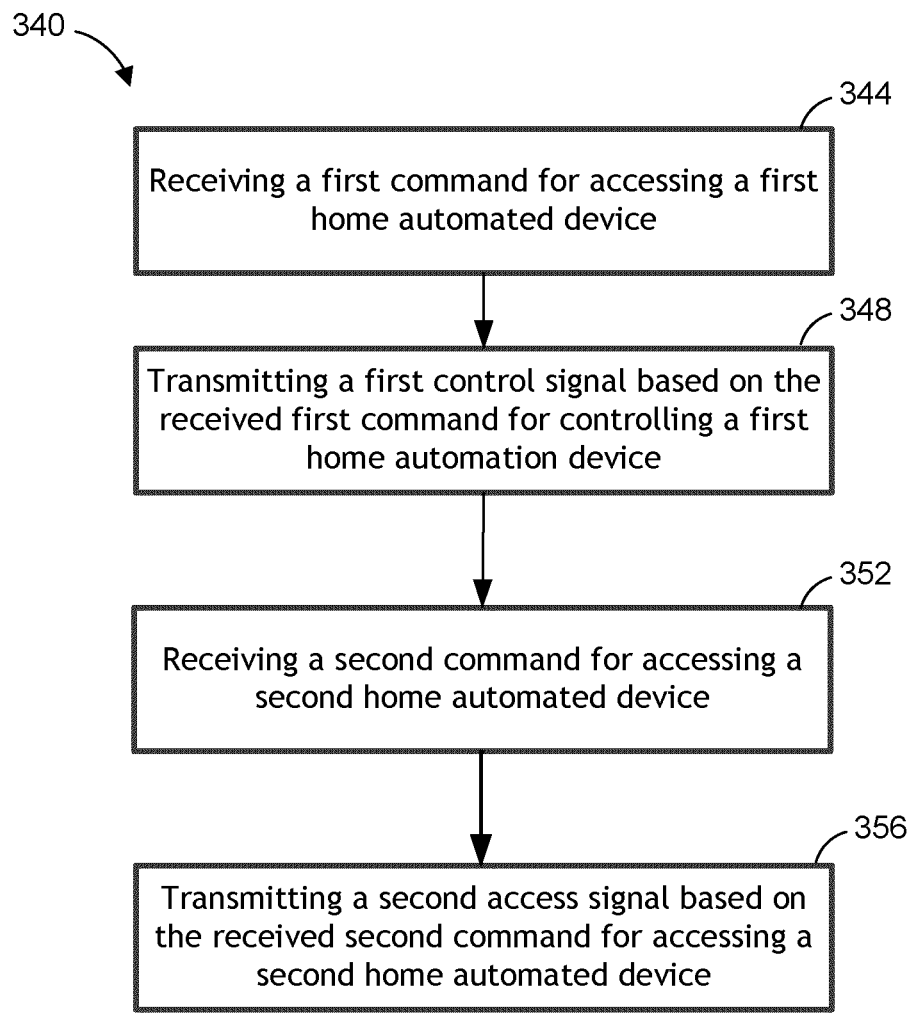
FIG. 12 illustrates a flowchart showing the operational steps of an exemplary method for accessing devices of a home automation system.

Referring now to FIG. 12, therein illustrated is a flowchart showing the operational steps of a method 340 for accessing devices of a home automation system. For example, the method may be carried out on the thermostat system 1 or 1' described herein.

At step 344, a first command for accessing a first home automated device is received. The first command may have been inputted via the user input device 80 or using a remote device over the wide area network 16.

At step 348, a first access signal is generated based on the first received command. The first access signal contains information for accessing the first home automated device.

The signal is transmitted to the first home automated device via a device interface module and independently of the home automation network. For example, the first home automated device may be the HVAC system and the device interface module is the HVAC interface module 36. Alternatively, the first home automated device may be a directly connected home automated device and the device interface module is an appropriately configured device interface for the first home automated device. For example, the first home automated device may be chosen from a security system, a surveillance system, an access control system and an external environmental monitoring device.

At step 352, a first command for accessing a second home automated device is received. The second command may have been inputted via the user input device 80 or using a remote device over the wide area network 16.

At step 356, a second access signal is generated based on the second received command. The second access signal contains information for accessing the second home automated device. The signal is transmitted to the second home automated device via the local area communication module and over the home automation network. For example, the second home automated device may be any device that is network connected to the thermostat system 1. For example, the second home automated device may be chosen from a HVAC system, a security system, a surveillance system, an access control system, an external environmental monitoring device household appliance, a lighting system and an entertainment device.

The method may further include receiving from the first home automated device a condition sensed by the device or a status of the device. The sensed condition or status is received from the first home automated device independently of the home automation network. The sensed condition or status may be displayed on the display 88 of the thermostat system 1 or transmitted via the wide area communication module 8 over the wide area network 16.

Similarly, a condition sensed by the second home automated device or a status of the second home automated device may be received. The sensed condition or status is received from the second home automated device via the home automation network. The sensed condition or status may be displayed on the display 88 of the thermostat system 1 or transmitted via the wide area communication module 8 over the wide area network 16.

Figure 13:
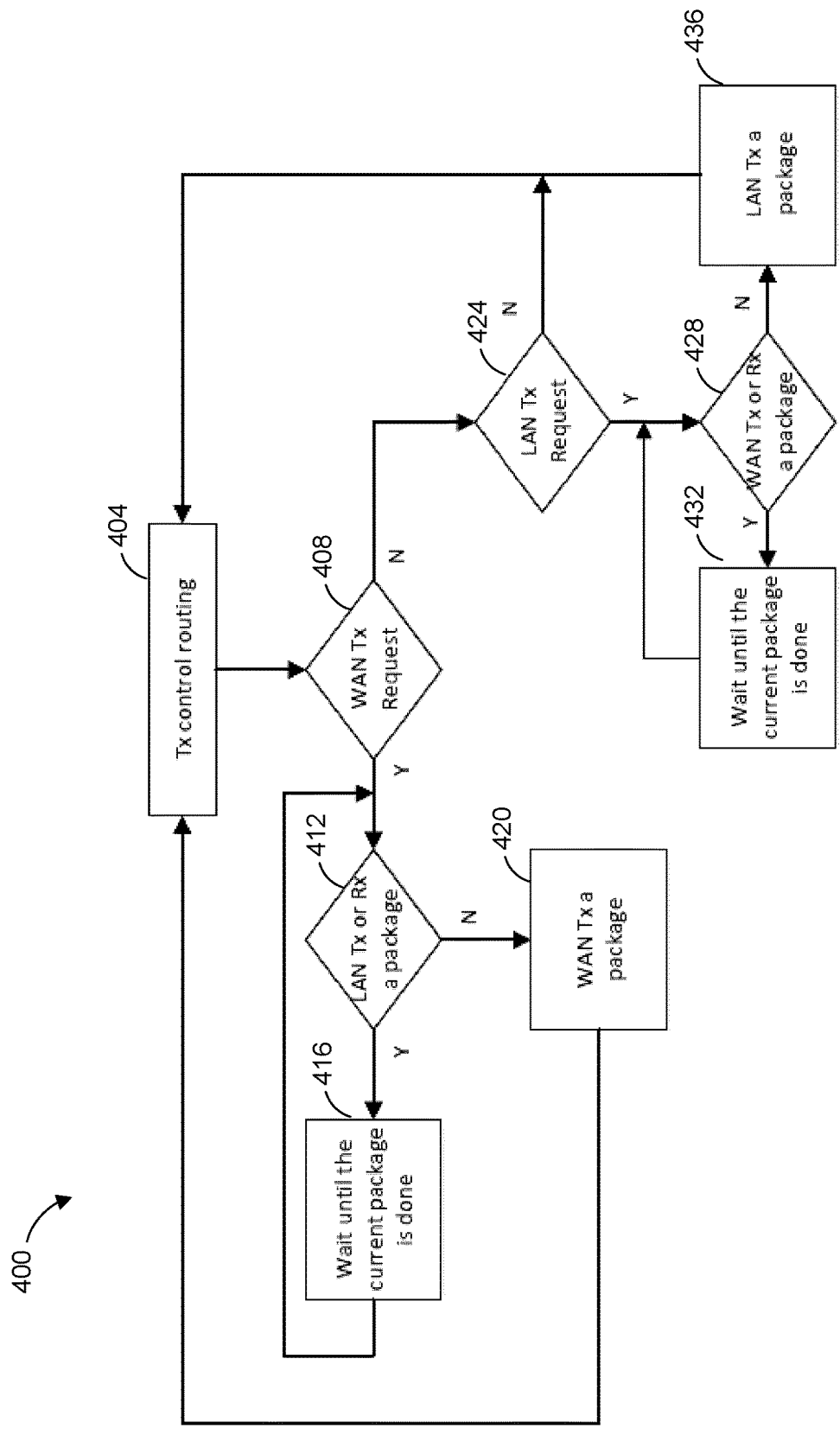
FIG. 13 illustrates a flowchart showing the operational steps of an exemplary method for communicating over a wide-area network and a local area network.

Referring now to FIG. 13, therein illustrated is a flowchart showing the operational steps of an exemplary method 400 for communicating over the wide-area network 16 and the local area network 8. At step 404, the method enters transmission control routing to retrieve a next transmission request.

At step 408, it is determined whether the retrieved transmission request is a wide area network transmission request for transmitting data via the wide area communication module 8. If the received transmission request is a wide area network transmission request, the method proceeds to step 412. If the received transmission requested in a local area network transmission request, the method proceeds to step 424.

At step 412, it is determined whether there is an ongoing transmission or reception of a data package by the local area communication module 20. If there is an ongoing transmission or reception, the method proceeds to step 416 to wait until the transmission or reception is completed. If there is not an ongoing transmission or reception, the method proceeds to step 420 to transmit via the wide area communication module 8 the data package identified in the received wide area network transmission requested. After completing the request, the method returns to step 404 to retrieve another transmission request.

At step 424, it is determined whether the retrieved transmission request is a local area network transmission request for transmitting data via the local area communication module 20. If the received transmission request is a local area network transmission request, the method proceeds to step 432. If the received transmission request is not a local area network transmission request, the method returns to step 404 to retrieve another transmission request.

At step 432, it is determined whether there is an ongoing transmission or reception of a data package by the wide area communication module 8. If there is an ongoing transmission or reception, the method proceeds to step 432 to wait until the transmission or reception is completed. If there is not an ongoing transmission or reception, the method proceeds to step 436 to transmit via the local area communication module 20 the data package identified in the received local area network transmission request. After completing the request, the method returns to step 404 to retrieve another transmission request.

It will be appreciated that the exemplary method 400 prioritizes wide-area network communication requests in that step 408 for treating wide-area communication requests is carried out prior to treating the local area communication request at step 424. However, according to various exemplary embodiments, the local area communication request may be treated prior to wide-area communication requests.

According to various exemplary embodiments, where limited processing power is available for the controller 32, various tasks may have to be ordered by priority in order to ensure appropriate user experience. For example, tasks having higher priority may be carried out first. For example, the types of tasks are ordered from highest to lowest according to touch input, backlight control, home automation control, HVAC control, video link, general web communication, download upgrade, and backup.

Figure 14:
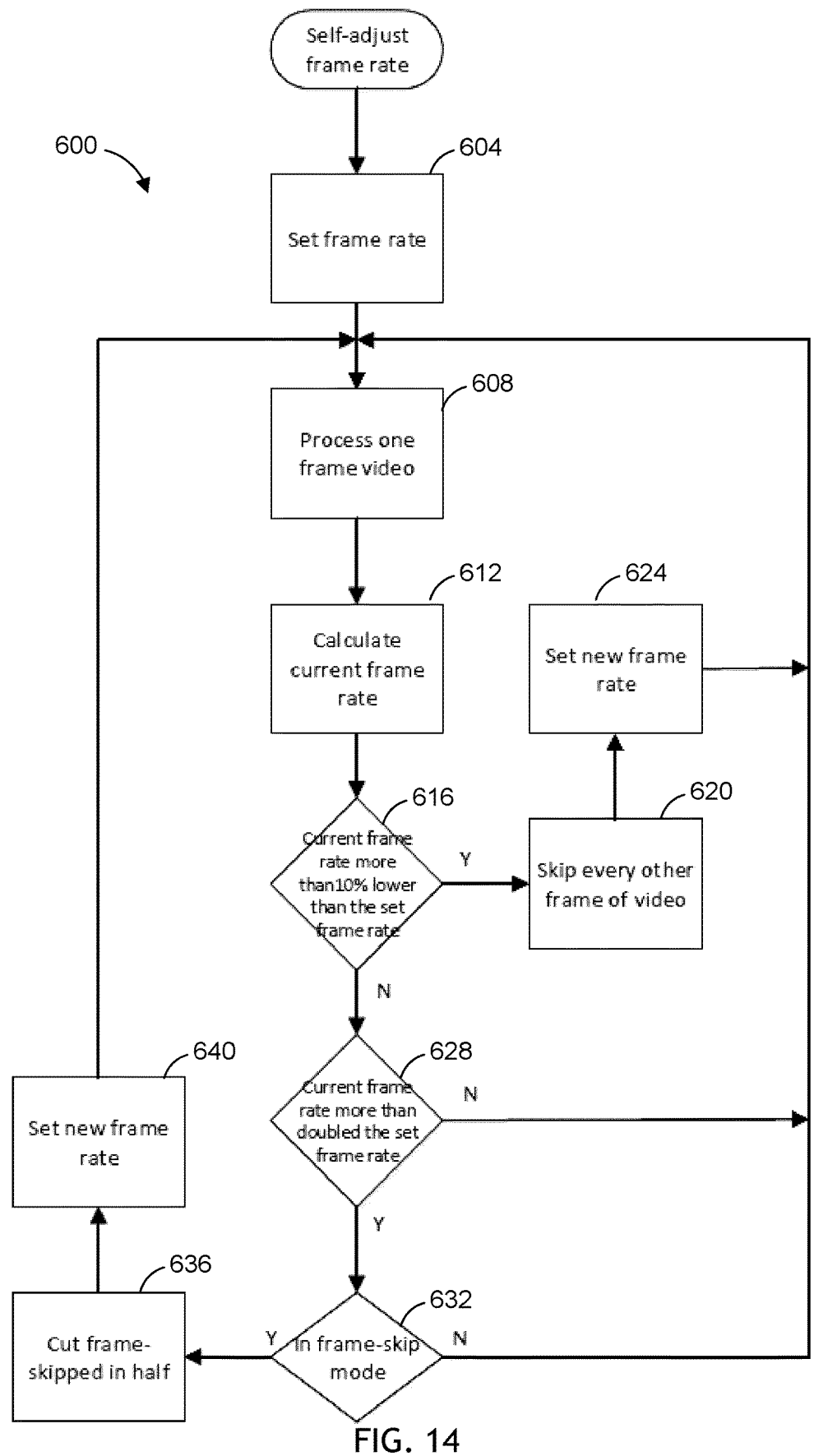
FIG. 14 illustrates a flow chart showing the operation steps of an exemplary method for setting a frame rate of a display of a thermostat system.

Referring now to FIG. 14, therein illustrated is a flowchart showing the operational steps of an exemplary method 600 for setting a frame rate of the display 88 of the thermostat system 1. According to various exemplary embodiments, the thermostat system 1 may display video on its display 88. The frame rate of the video may be adjusted to take into account other tasks having higher priority than displaying video.

At step 604, a desired or default frame rate is set.

At step 608, the processing time for processing one frame of a video is determined.

At step 612, the current frame rate is calculated from the processing time determined at step 608.

At step 616, it is determined whether the current frame rate is substantially lower than the desired or default frame rate set at step 604. For example, it may be determined whether the current frame rate is more than 10% lower than the set frame rate. If the current frame rate is substantially lower, the method proceeds to step 620. If the current frame rate is not substantially lower, the method proceeds to step 628.

At step 620, the processing of the video is adjusted so as to reduce the processing power required. For example, one out of a given every number frames is skipped and not processed. For example, every other frame of the video is skipped. For example, the number of skipped frames is doubled.

At step 624, the set frame rate is adjusted based on the adjustment of the processing of the video.

At step 628, it is determined whether the current frame rate is substantially higher than the set frame rate. For example, it may be determined whether the current frame rate is more than double the set frame rate. If the current frame is substantially higher, the method proceeds to step 632. If the current frame is not substantially higher, the method returns to step 608 to continue monitoring the current frame rate.

At step 632, it is determined whether the processing of the video had been previously adjusted so as to reduce the processing power required. For example, it is determined whether the processing the video had already been adjusted to skip one out of every given number of frames. If processing of the video had not been previously adjusted, the method returns to step 608 to continue monitoring the current frame rate. If the processing had been previously adjusted, the method proceeds to step 636.

At step 636, the processing of the video is adjusted so as to increase the processing power applied for video processing. For example, where one out of a given number of frames is skipped, the number of skipped frames is reduced. For example, the number of skipped frames is halved.

At step 640, the set frame rate is adjusted based on the adjustment of the processing of the video at step 636.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The invention claimed is:

1. A thermostat system comprising:
   an HVAC interface module for controlling an external HVAC system;
   a wide-area communication module for data communication with an external network;
   a local communication module for data communication over a home automation network; and
   a controller including a first control submodule in signal communication with the HVAC interface module, and a second control submodule in signal communication with the wide-area communication module and the local communication module, the controller configured for:
   receiving at the first control submodule a first command, the first command instructing a change of an environmental setting;
   generating by the first control submodule a first control signal based on the received first command, the first control signal configured to control the external HVAC system via the HVAC interface to change the environmental setting;
   receiving at the second control submodule a second command, the second command instructing a change of a non-environmental setting;
   generating by the second control submodule a second control signal based on the received second command, the second control signal configured to control at least one home automated device via the local communication module over the home automation network to change the non-environmental setting;
   receiving at the first control submodule a first sensed environmental condition over a path that bypasses the home automation network; and
   generating by the first control submodule, based on the first sensed environmental condition, a third control signal to control the HVAC system via the HVAC interface,
   wherein the first command is received at the first control submodule via the wide-area communication module,
   wherein the second command is received at the second control submodule via the wide-area communication module,
   wherein the thermostat system further comprises a power supply configured to receive current from the external HVAC system via the HVAC interface module, the power supply further supplying electrical power to the controller,
   wherein the external HVAC system is controlled via the HVAC interface independently of the home automation network,
   wherein the thermostat system further comprises at least one environmental sensor for sensing the at least one environmental condition, and
   wherein the controller is further configured for:
   receiving at the second control submodule a second sensed condition from a first home automated device over a path that bypasses the home automation network;
   receiving at the second control submodule a third sensed condition from a home automated device via the home automation network; and
   transmitting both the second sensed condition and the third sensed condition to a remote device over the external network.

2. The thermostat system of claim 1, further comprising at least one non-environmental device chosen from a surveillance system, a security system and an access control system; and wherein the controller is further configured for receiving the at least one condition monitored by the non-environmental device independently of the home automation network.

3. The thermostat system of claim 2, wherein the controller is further configured for transmitting the at least one condition monitored by the non-environmental device to a remote device via the wide-area communication module.

4. The thermostat system of claim 1, wherein the second control signal controls the at least one home automated device according to a home automation network protocol.

5. The thermostat system of claim 1, further comprising a user input device for inputting a user command for controlling at least one of the external HVAC system or the at least one home automated device via the local communication module.

6. The thermostat system of claim 1, further comprising an enclosure for housing the HVAC interface module, the wide-area communication module, the local communication module and the controller, the housing having at least one mounting mechanism for mounting onto a vertical wall.

7. A method for accessing a home automation system, the method comprising:
   receiving at a first control submodule a first command, the first command instructing a change of an environmental setting;

generating by the first control submodule a first control signal based on the received first command, the first control signal configured to control the external HVAC system via the HVAC interface to change the environmental setting;

receiving at a second control submodule a second command, the second command instructing a change of a non-environmental setting;

generating by the second control submodule a second control signal based on the received second command, the second control signal configured to control at least one home automated device via the local communication module over the home automation network to change the non-environmental setting;

receiving at the first control submodule a first sensed environmental condition over a path that bypasses the home automation network; and generating by the first control submodule, based on the first sensed environmental condition, a third control signal to control the HVAC system via the HVAC interface, wherein the second control signal is transmitted over a home automation network and wherein transmitting the first control signal to the HVAC system bypasses the home automation network, and wherein the method further comprises:
receiving at the second control submodule a second sensed condition from a first home automated device over a path that bypasses the home automation network;

receiving at the second control submodule a third sensed condition from a home automated device via the home automation network; and transmitting both the second sensed condition and the third sensed condition to a remote device over the external network.

8. The method of claim 7, wherein the first command is received at the first control submodule over a wide-area network.

9. The method of claim 7, wherein the second command is received at the second control submodule over a wide-area network.

10. The method of claim 7, further comprising receiving a second sensed condition from a home automated device.

* * * * *